United States Patent [19]

Ito

[11] Patent Number: 5,779,301
[45] Date of Patent: Jul. 14, 1998

[54] SUN ROOF DEVICE

[75] Inventor: Koichi Ito, Kariya, Japan

[73] Assignee: Aisin Seiki Kabushiki Kaisha, Kariya, Japan

[21] Appl. No.: 429,635

[22] Filed: Apr. 27, 1995

[30] Foreign Application Priority Data

Apr. 27, 1994 [JP] Japan .................... 6-090158
Nov. 30, 1994 [JP] Japan .................... 6-297473

[51] Int. Cl.⁶ .................................... B60J 7/043
[52] U.S. Cl. .................. 269/216; 296/217; 296/224; 49/466
[58] Field of Search .................... 296/216, 217, 296/224; 49/466

[56] References Cited

U.S. PATENT DOCUMENTS

| 4,978,165 | 12/1990 | Schreiter et al. | 296/216 |
| 5,046,779 | 9/1991 | Ichinose et al. | 296/216 |
| 5,383,991 | 1/1995 | Brocke et al. | 296/216 X |
| 5,516,186 | 5/1996 | Scherf et al. | 296/216 |

FOREIGN PATENT DOCUMENTS

| 38 40 491 | 4/1990 | Germany. |
| 39 03 035 | 8/1990 | Germany. |
| 40 05 790 | 9/1990 | Germany. |
| 4238889 A1 | 5/1994 | Germany ..... 296/216 |
| 60-206724 | 10/1985 | Japan. |
| 61-193926 | 8/1986 | Japan. |
| 6166328 | 6/1994 | Japan ..... 296/216 |
| 2 226 069 | 6/1990 | United Kingdom. |

Primary Examiner—Gary C. Hoge
Attorney, Agent, or Firm—Burns, Doane, Swecker & Mathis, LLP

[57] ABSTRACT

A sun-roof device includes a lid for being fitted within a vehicle-roof opening, the lid having a glass and a fixing portion formed integrally with the outer periphery of a glass so as to be coplanar therewith, and a weather strip adhered to an outer surface of the fixing portion so as to be coplanar therewith by adhesive device.

17 Claims, 5 Drawing Sheets

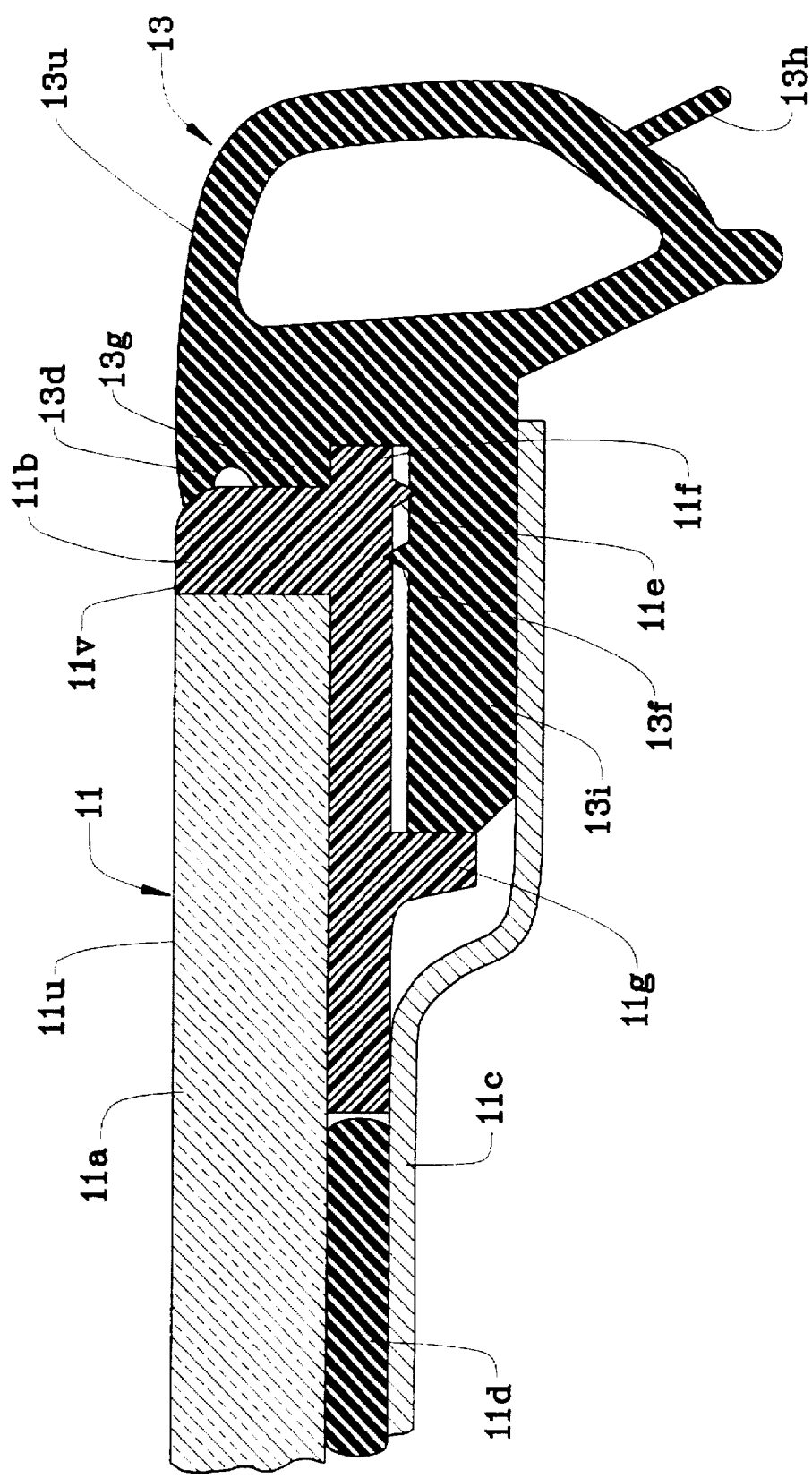

SUN ROOF DEVICE

FIELD OF THE INVENTION

The present invention relates to a sun-roof device and in particular to a weather strip mounting structure used in a sun-roof.

BACKGROUND OF THE INVENTION

In Japanese Patent Laid-open Print No. Sho 61-193926 published on Aug. 28, 1986 without examination, a lid which is fitted within a vehicle-roof opening is made of glass and the outer periphery of the lid is integrally formed with a fixing member which is made of synthetic resin. A weather strip which is made of a rubber or a similar elastic material is fitted in an outer groove located in the fixing member to establish a fluid-tight relationship between the vehicle-roof opening and the lid.

In this prior art construction, the outer groove of the fixing member is formed concurrently with the integral formation of the fixing member and the lid by using a mold. However, the formation of the outer groove in the fixing member requires a core, which means that the structure of the mold per se becomes more complex. In addition, it is cumbersome to fit the weather strip into the outer groove of the fixing member.

In Japanese Patent Laid-open Print No. Sho 60-206724 published on Oct. 18, 1985 without examination, a lid which is fitted within a vehicle-roof opening is made of glass and is provided or secured at its outer periphery with a weather strip which is made of rubber or a similar elastic material. However, according to this prior art construction, an inaccurate measuring error in the structure of the weather strip can make it difficult to establish a fluid-tight relationship between the vehicle-roof opening and the lid.

In addition, in the prior art constructions described above, the upper surface of the fixing member and/or the weather strip is higher than the upper surface of the glass member, thereby resulting in the creation of wind noise during the vehicle's travel.

SUMMARY OF THE INVENTION

A need exists, therefore, for a sun-roof device that can be made by a mold that is not as complex as molds used to make other known sun-roof devices.

A need also exists for a sun-roof device which is not susceptible to problems associated with measuring errors in the structure of the weather strip, to thereby ensure establishment of a fluid-tight relationship between the vehicle-roof opening and the lid.

To address the foregoing needs, the sun-roof device according to the present invention comprises a panel for being fitted within a vehicle-roof opening, the panel including a glass member and a fixing portion formed integrally with the outer periphery of the glass member so as to be coplanar therewith, and a weather strip adhered to the outer surface of the fixing portion so as to be coplanar with the upper surface of the fixing portion, thereby obviating the drawbacks associated with the prior art constructions.

In accordance with another aspect of the invention, a sun-roof device includes a panel for being positioned within a vehicle-roof opening for movement between an opened and a closed position. The panel includes a glass member and a fixing portion, with the fixing portion being formed integrally around the outer periphery of the glass member. The upper surface of the fixing portion and the upper surface of the glass member are coplanar with one another, and the fixing portion is provided with an outer extension. A weather strip is positioned at the outer side of the fixing portion, and the weather strip has a part that receives the outer extension of the fixing portion. The upper surface of the weather strip is coplanar with the upper surface of the fixing portion, and the weather strip is provided with an inner extension that is opposed to the lower surface of the fixing portion. A projection is formed integrally with at least one of the inner extension of the weather strip and the lower surface of the fixing portion, and an urging arrangement is provided for urging the inner extension of the weather strip toward the lower surface of the fixing portion.

BRIEF DESCRIPTION OF THE DRAWING FIGURES

The features and advantages of the present invention will be more apparent and more readily appreciated from the following detailed description of preferred exemplary embodiments of the present invention, considered in conjunction with the accompanying drawing figures, in which like elements bear like reference numerals and wherein;

FIG. 6 is a cross-sectional view showing a fourth modification of the structure shown in FIG. 2.

DETAILED DESCRIPTION OF THE PREFERRED EMBODIMENTS

Figure 1:
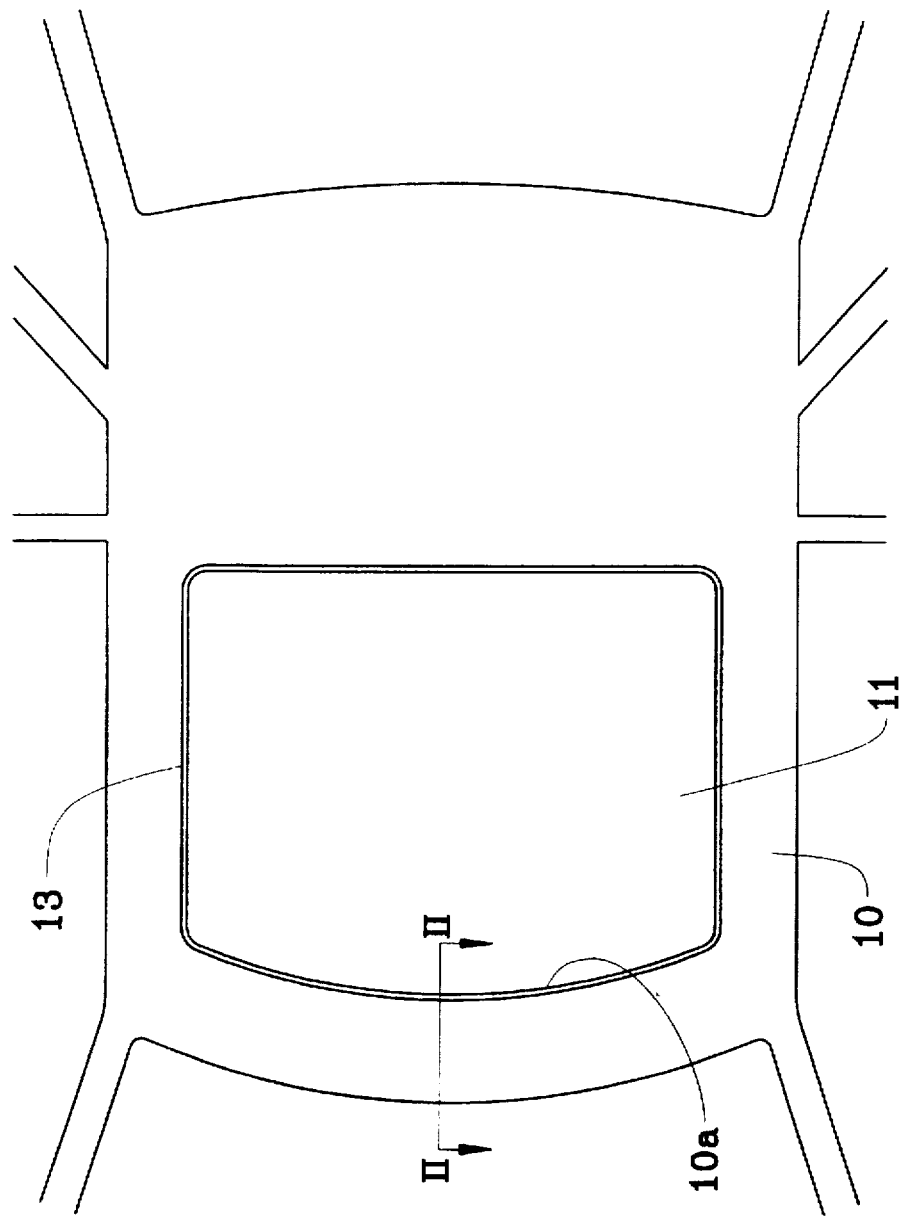
FIG. 1 is a plan view of a vehicle-roof provided with a weather strip mounting configuration according to the present invention.

Referring first to FIG. 1, a vehicle roof panel 10 is provided with a substantially rectangular opening or aperture 10a and a movable lid or panel 11 is fitted within the opening 10a. The lid 11 is operatively associated with a link mechanism (not shown) for effecting tilt movement and sliding movement of the lid 11 relative to the roof panel 10. The aforementioned tilt movement refers to vertical movement of a rear portion of the lid 11 and the aforementioned sliding movement refers to movement of the lid 11 along the lengthwise direction of the vehicle (i.e., away from and towards the front of the vehicle). Thus, in a known manner, the panel 11 moves between an open position in which the vehicle-roof opening 10a is opened and a closed position in which the vehicle-roof opening 10a is closed. A weather strip 13 is provided on an outer periphery of the lid 11 to establish a fluid-tight relationship between the opening 10a and the lid 11 when the lid 11 is positioned within the opening 10a.

Figure 2:
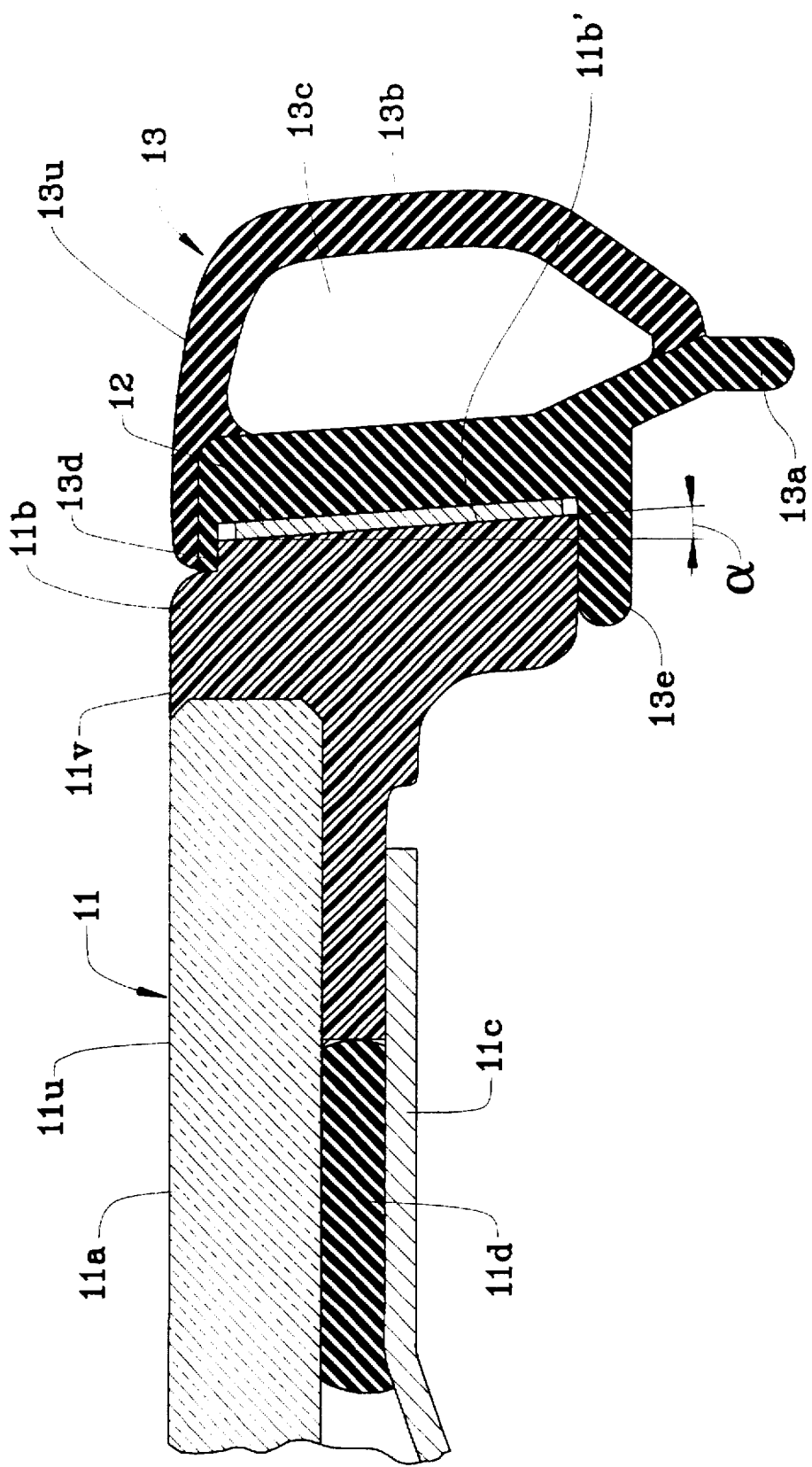
FIG. 2 is a cross-sectional view taken along the section line II—II in FIG. 1.
Figure 3:
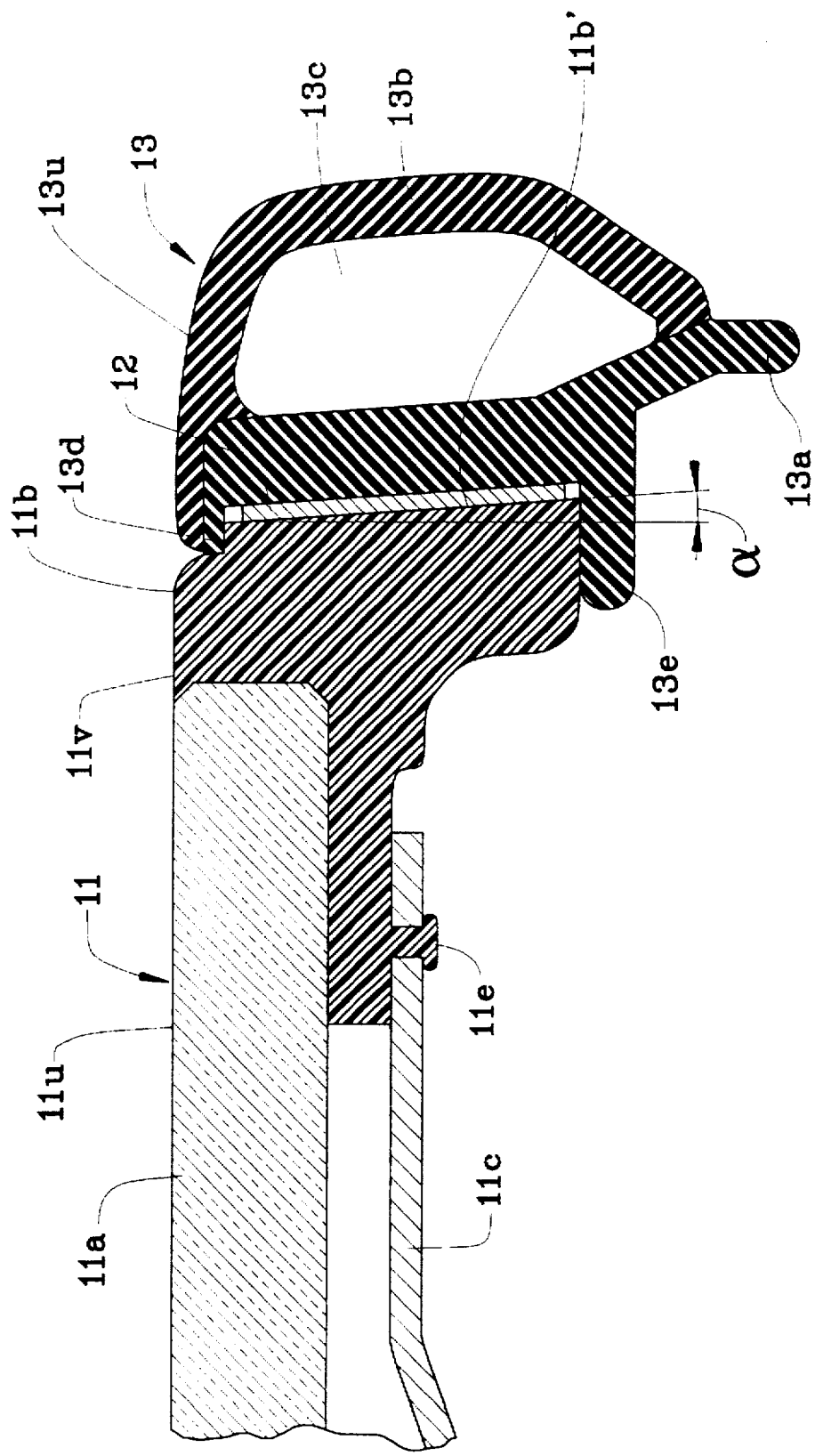
FIG. 3 is a cross-sectional view showing a first modification of the structure shown in FIG. 2.

One possible construction for mounting the weather strip 13 on the lid 11 is disclosed in detail in FIGS. 2 and 3.

Referring to FIGS. 2 and 3, the lid 11 includes a glass member 11a, a fixing portion 11b surrounding the entire outer periphery of the glass member 11a for being connected integrally thereto, a reinforcing inner panel 11c secured to the glass member 11a by a bolt (not shown) for reinforcing the glass member 11a, and a spacer or a bonding agent 11d for filling up a gap between the glass member 11a and the inner panel 11c. The fixing portion 11b is preferably made of synthetic resin while the reinforcing inner panel 11c is preferably made of metal. The integration of the fixing portion 11b and the glass member 11a is established concurrently upon formation of the fixing portion 11b and formation of the glass member 11a.

As shown in FIG. 3, instead of the spacer or bonding agent 11d, an engaging portion 11e of the fixing portion 11b can be provided to interlock with the inner panel 11c. In other embodiments disclosed in the present application, the inner panel 11c can be adapted to be secured to the lid 11 by one of the aforementioned inner panel mounting structures.

As shown in FIG. 2, the outer periphery 11b' of the fixing portion 11b is connected to the inner periphery of the weather strip 13 by way of a double sided adhesive tape 12. Employing the double sided adhesive tape 12 will save time with respect to that which is normally required for connecting the weather strip 13 to the lid 11. In addition, the double sided adhesive tape 12 possesses a uniform thickness, which makes it difficult to separate the weather strip 13 from the lid 11.

As shown in FIG. 3, instead of the double sided adhesive tape 12, a bonding agent 12' can be used, which can make it over more difficult to separate the weather strip 13 from the lid 11. The bonding agent 12' can be used as an alternative to the tape 12 in all embodiments of the present invention.

As seen in FIGS. 2 and 3, the outer periphery or outer surface 11b' of the fixing portion 11b' is inclined outwardly away from the glass member 11a to form an angle α of about 5 degrees relative to a vertical line or plane. Thus, the downward load applied to the weather strip 13 in the vertical direction is partially reduced in the form of a horizontal component which is especially useful when the lid 11 is experiencing tilt movement. Thus, the load applied in the direction of separation of the double sided adhesive tape 12 or the bonding agent 12' from the outer periphery 11b' of the fixing portion 11b can be reduced, thereby ensuring that the tape 12 or bonding agent 12' remains connected to the outer periphery 11b' of the fixing portion 11b. It is to be noted that expanding the area of both the outer periphery 11b' and the double sided tape 12 (the bonding agent 12') in the vehicle vertical direction is also effective in this regard. The reason is because the load can be distributed over a wider area.

The weather strip 13 serves for establishing a fluid-tight relationship between the vehicle-roof panel 10 and the lid 11. The weather strip 13 is adapted to elastically engage a flange portion (not shown) of the roof panel 10 which extends downwardly for defining the opening 10a in the vehicle-roof panel 10.

The weather strip 13 includes an inner peripheral portion 13a made of hard rubber, an outer peripheral portion 13b made of soft rubber, and a hollow portion 13c defined therebetween. This structure enables a reliable connection of the weather strip 13 at its inner side to the fixing portion 11b of the lid 11 and also provides a fluid-tight connection between the roof panel 10 and the lid 11 despite variations in tolerance.

The weather strip 13 is provided at its inner upper portion and inner lower portion with a covering portion 13d and a rib 13e, respectively. The covering portion 13d is positioned on and covers the upper portion of the outer periphery 11b' of the fixing portion 11b to prevent water invasion toward the double sided adhesive tape 12 (the bonding agent 12'). The rib 13e of the weather strip 13 is used for positioning the weather strip 13 in the vertical direction. The rib 13e engages the lower side of the fixing portion 11b for preventing vertical movement of the weather strip 13 relative to the fixing portion 11b which may occur by vertically generated stress in the weather strip 13 while the opening 10a is being closed. It is also to be noted that the connection of the weather strip 13 and the fixing portion 11b can be established in a reliable manner if such a connection is made after engagement of the rib 13e of the weather strip 13 with the lower side of the fixing portion 11b. As mentioned above, the use of the double sided adhesive tape 12 (the bonding agent 12') causes no interference between the lid 11 and the weather strip 13, resulting in that a narrower gap or clearance between the lid 11 and the opening 10a can be defined.

In the structures shown in FIGS. 2 and 3, the upper surface 11u of the glass member 11a, the upper surface 11v of the fixing portion 11b, and the upper surface 13u of the weather strip 13 are coplanar with each other. As a result, the lid 11 does not form a projection which might otherwise cause wind noise while the vehicle travels. It is to be noted that such a feature is common throughout all embodiments of the present invention.

Figure 4:
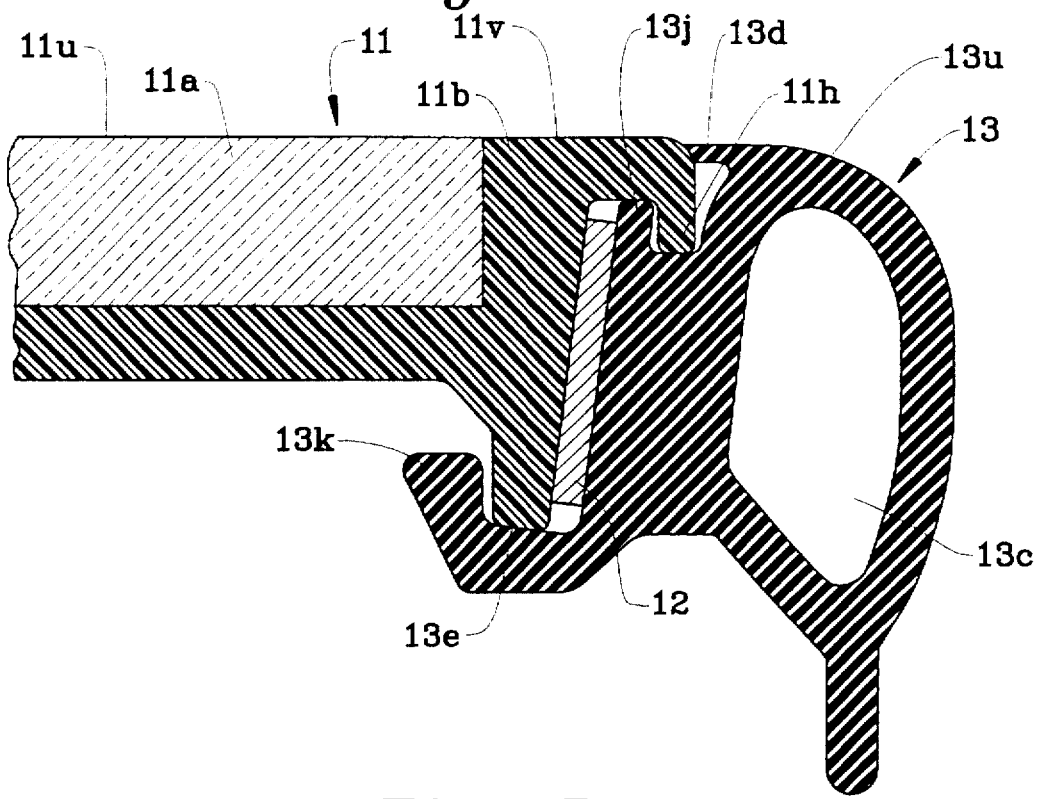
FIG. 4 is a cross-sectional view showing a second modification of the structure shown in FIG. 2.
Figure 5:
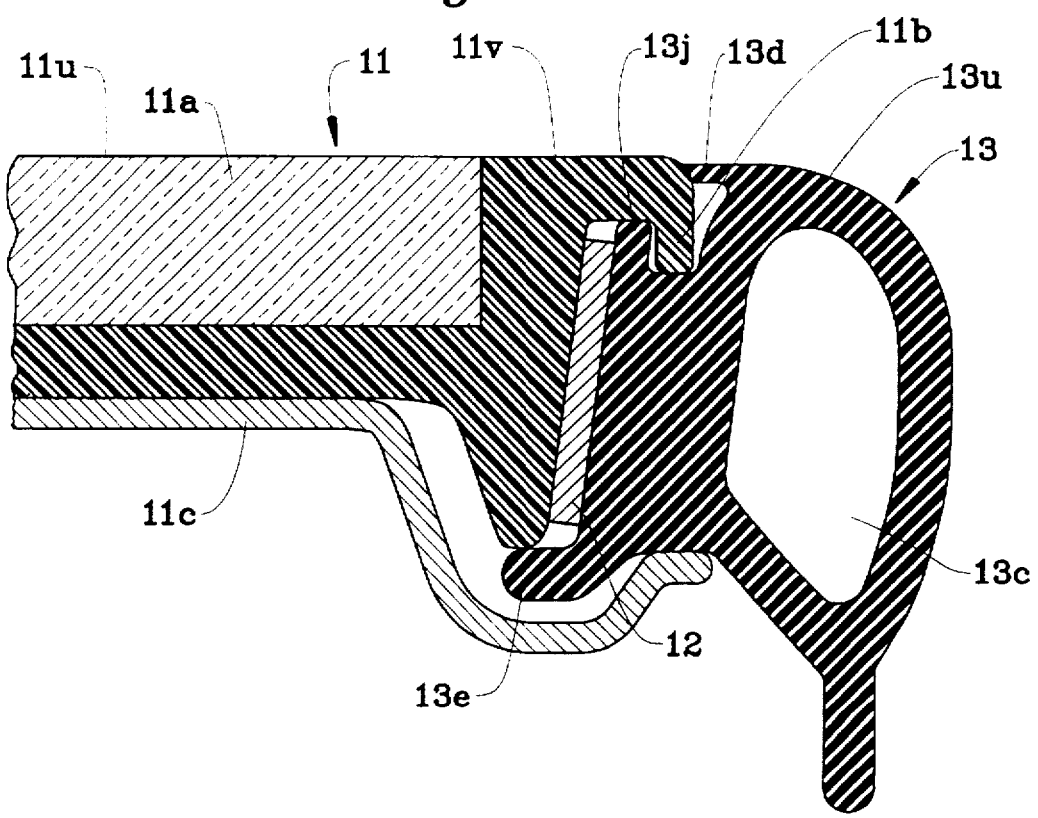
FIG. 5 is a cross-sectional view showing a third modification of the structure shown in FIG. 2.

As shown in FIGS. 4 and 5, the upper portion of the fixing portion 11b is provided with a hook portion 11h. The hook portion 11h extends outwardly away from the glass member 11a and downwardly away from the upper surface 11v of the fixing portion 11b. The hook portion 11h interlocks with an upwardly directed projection 13j extending from the inner periphery of the weather strip 13. The upwardly directed projection 13j extends inwardly from the inner periphery of the weather strip in the direction towards the fixing portion 11b and extends upwardly in the direction of the upper surface 13u of the weather strip 13. This interlock assists the engagement between the weather strip 13 and the lid 11 that is produced by the double sided adhesive tape 12 (the bonding agent 12').

As shown in FIG. 4, a distal end portion of the rib 13e is turned upwardly to form an engaging portion 13k which is adapted to engage the lower end of the fixing portion 11b. As shown in FIG. 5 the engagement between the engaging portion 13j and the lower end of the fixing portion 11b can be assisted by an inner panel 11c whose outer periphery, after extending below the rib 13e, engages the lower surface of the weather strip 13. It is to be noted that such an inner panel 11c constitutes an existing element and therefore no significant additional production cost is required.

As shown in FIG. 6, a continuous rectangular edge projection 11e which is oriented or projected in the downward direction (i.e., in the direction away from the upper surface 11v of the fixing portion 11b) is formed on the lower side of the fixing portion 11b of the lid 11. Also an annular edge projection 13f which is oriented in the upward direction (i.e., in the direction toward the lower side of the fixing portion) is formed on an inward extension of the weather strip 13.

The weather strip 13 is also provided with an inward extension lip 13g so that the outward extension 11f of the lid 11 is held between the inward extension lip 13g and the inner extension 13i of the weather strip 13. The inner extension 13i of the weather strip 13 is supported by the inner panel 11c to be urged thereby in the upward direction. Employing the inner panel 11c for assisting the connection between the lid 11 and the weather strip 13 is advantageous as it results in no significant additional production cost.

In addition, the outer periphery of the weather strip 13 is provided with a lip portion 13h for preventing air ventilation to the outside of the vehicle from the interior of the vehicle due to a pressure differential therebetween while the vehicle is travelling. The fixing portion 11b of the lid 11 also has a downwardly extending rib 11g. The rib 11g engages the inward extension 13c of the weather strip 13 for horizontal positioning thereof. Thus, it can be seen that the projections 11e, 13f serve as alternative to the tape 12 and bonding agent 12'. It is to be noted that either one of the annular edge projection 11e and the annular edge projection 13f can be omitted so that only a single annular projection is provided.

As described above, employing the double sided adhesive tape 12 (the bonding agent 12' or the projections 11e and 13f) and the inner panel 11e enables a connection of the weather strip 13 to the lid without fitting the weather strip 13 into the fixing portion 11b. Thus, the fixing portion 11b does not have to be provided with a groove and therefore the mold for integrally connecting the lid and the fixing portion requires no core, thereby simplifying the structure of the mold per se. It is to be noted that the structure shown in FIGS. 3 and 4, the portions 11h and 11e do not constitute a concave configuration and therefore such portions 11h and 11e do not make the mold more complex in structure. Furthermore, the dimensional instability of the lid 11 in the horizontal direction (the vehicle lengthwise direction) can be absorbed due to the integral formation of the lid 11 with the fixing portion 11b.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sun-roof device comprising:

a lid panel for being fitted within an opening of a vehicle roof, the lid panel including a glass member, an inner panel connected to the glass member and a fixing portion formed integrally with the outer periphery of the glass member, said glass member having an upper surface, said fixing portion having an upper surface and a lower surface, the upper surface of the glass member being substantially coplanar with the upper surface of the fixing portion;

a weather strip for establishing a fluid-tight seal between the lid panel and the vehicle roof, the inner panel urging a portion of the weather strip towards the lower surface of the fixing portion; and adhesive means for connecting the weather strip to the inner panel, said weather strip including an upper surface that is substantially coplanar with the upper surface of the fixing portion.

2. A sun-roof device as set forth in claim 1, wherein the adhesive means is a double sided adhesive tape.

3. A sun-roof device as set forth in claim 1, wherein the adhesive means is a bonding agent disposed between an outer surface of the fixing portion and the weather strip.

4. A sun-roof device as set forth in claim 1, wherein the adhesive means is secured to an outer surface of the fixing portion, the outer surface of the fixing portion being inclined relative to a vertical plane so that a load applied along the outer surface of the fixing portion includes a vertical component and a horizontal component.

5. A sun-roof device as set forth in claim 1, wherein the adhesive means is secured to an outer surface of the fixing portion, at least one of the fixing portion and the weather strip being provided with a covering portion that covers an upper side of the outer surface of the fixing portion.

6. A sun-roof device as set forth in claim 1, further comprising interlocking means for preventing horizontal separation of the weather strip and the fixing portion.

7. A sun-roof device as set forth in claim 6, wherein the interlocking means includes a first hook portion provided at an upper portion of the fixing portion, the first hook portion extending outwardly away from the glass member and being turned downwardly away from the upper surface of the fixing portion to interlock with an inwardly extending and upwardly turned projection provided at an inner periphery of the weather strip.

8. A sun-roof device as set forth in claim 1, including a rib extending from the weather strip for preventing vertical separation of the weather strip and the fixing portion.

9. A sun-roof device comprising:

a panel for being positioned within a vehicle-roof opening for movement between an opened and a closed position, the panel including a glass member and a fixing portion, the fixing portion being formed integrally around an outer periphery of the glass member, an upper surface of the fixing portion and an upper surface of the glass member being substantially coplanar with one another, the fixing portion being provided with an outer extension;

a weather strip positioned at an outer side of the fixing portion, the weather strip having a part that receives the outer extension of the fixing portion, an upper surface of the weather strip being substantially coplanar with the upper surface of the fixing portion, the weather strip being provided with an inner extension that is opposed to a lower surface of the fixing portion;

a projection formed integrally with one of the inner extension of the weather strip and the lower surface of the fixing portion; and urging means for urging the inner extension of the weather strip toward the lower surface of the fixing portion.

10. A sun-roof device as set forth in claim 9, wherein the outer extension is formed integrally with the fixing portion and is received in a groove provided in an inner periphery of the weather strip the groove being defined between the inner extension of the weather strip and a lip formed on the weather strip.

11. A sun-roof device as set forth in claim 9, wherein said projection is formed integrally with the inner extension of the weather strip, and including another projection formed integrally with the lower surface of the fixing portion and extending towards the inner extension of the weather strip.

12. A sun-roof device as set forth claim 9, including a rib extending from the lower surface of the fixing portion, said rib engaging an end of the inner extension of weather strip.

13. A weather strip mounting construction in which a weather strip is connected to an outer periphery of a panel that is adapted to be fitted within a vehicle-roof opening to establish a fluid-tight relationship between an inner periphery of the vehicle-roof opening and the panel, the weather strip mounting construction comprising:

a fixing portion formed integrally with an outer periphery of a glass member forming a part of the panel, the fixing portion having an upper surface and an oppositely located lower surface, an upper surface of the glass member, the upper surface of the fixing portion and an upper surface of the weather strip being substantially coplanar with each other, a portion of the weather strip being urged towards the lower surface of the fixing portion by an inner panel that is secured to the glass member; and engaging means for engaging the weather strip to an outer surface of the fixing portion.

14. A weather strip mounting construction as set forth in claim 13, wherein said engaging means includes a double sided adhesive tape.

15. A weather strip mounting construction as set forth in claim 13, wherein said engaging means includes a bonding agent.

16. A weather strip mounting construction as set forth in claim 13, wherein said engaging means includes a portion of the fixing portion interlocking with a portion of the weather strip.

17. A sun-roof device as set forth in claim 9, wherein the urging means includes an inner panel that is secured to the glass member, an end portion of the inner panel urging the inner extension of the weather strip towards the lower surface of the fixing portion.

* * * * *